US00RE44291E

(19) United States
(12) Reissued Patent
Kim et al.

(10) Patent Number: US RE44,291 E
(45) Date of Reissued Patent: Jun. 11, 2013

(54) SECONDARY BATTERY HAVING CAP ASSEMBLY

(75) Inventors: Kyong-Jin Kim, Yongin-si (KR); Young-Bae Sohn, Yongin-si (KR); Jang-Ho Yoon, Yongin-si (KR); Young-Pil Choi, Yongin-si (KR)

(73) Assignee: Samsung SDI Co., Ltd. (KR)

(21) Appl. No.: 12/876,070

(22) Filed: Sep. 9, 2010

Related U.S. Patent Documents

Reissue of:
(64) Patent No.: 6,509,115
Issued: Jan. 21, 2003
Appl. No.: 09/736,164
Filed: Dec. 15, 2000

(30) Foreign Application Priority Data

Dec. 15, 1999 (KR) ..... 10-1999-0057811

(51) Int. Cl.
*H01M 2/04* (2006.01)

(52) U.S. Cl.
USPC ..... 429/175; 429/180; 429/181; 429/185; 429/163; 429/53; 429/54; 429/72; 429/82; 429/176

(58) Field of Classification Search
None
See application file for complete search history.

(56) References Cited

U.S. PATENT DOCUMENTS 5,985,478 A 11/1999 Kim
6,403,250 B1 6/2002 Azema et al.

FOREIGN PATENT DOCUMENTS

EP 0573998 12/1993
EP 0573998 A1 * 12/1993
JP 58-60862 * 4/1983
JP 60-59467 * 4/1985

* cited by examiner

*Primary Examiner* — Barbara Gilliam
*Assistant Examiner* — Angela Martin
(74) *Attorney, Agent, or Firm* — Knobbe Martens Olson & Bear LLP

(57) ABSTRACT

A secondary battery having a cap assembly, including an electrode assembly; a case in which the electrode assembly is located; a cap assembly having a cap plate coupled to and hermetically sealing the case. A terminal member has a head with a stepped protrusion penetrating the cap plate and insulated from the cap plate by an insulating member. The stepped protrusion presses the insulating member in multiple steps. The terminal member is connected to a positive or negative electrode terminal of the electrode assembly.

19 Claims, 3 Drawing Sheets

SECONDARY BATTERY HAVING CAP ASSEMBLY

Matter enclosed in heavy brackets [ ] appears in the original patent but forms no part of this reissue specification; matter printed in italics indicates the additions made by reissue.

*CROSS-REFERENCE TO RELATED APPLICATIONS*

*This application is for reissue of U.S. Pat. No. 6,509,115 issued on Jan. 21, 2003 from U.S. patent application Ser. No. 09/736,164, filed Dec. 15, 2000, which claims priority to Korean Patent Application No. 10-1999-0057811, filed Dec. 15, 1999.*

BACKGROUND OF THE INVENTION

1. Field of the Invention

The present invention relates to a secondary battery, and more particularly, to a rectangular secondary battery having a cap assembly with improved terminal members.

2. Description of the Related Art

Recently, chargeable secondary batteries adoptable for miniaturized cellular phones, notebook computers, compact camcorders and the like have been studied. In particular, lithium ion batteries have rapidly been introduced in the market in the light of their high energy density per unit weight.

In such lithium ion batteries, lithium cobaltate ($LiCoO_2$) is mainly used as a positive active material, and a carbon material is used as a negative active material. Recently, some batteries using lithium manganese oxides having a spinel structure as a positive active material have also been developed. Secondary batteries are classified into liquid electrolyte batteries and polymer electrolyte batteries according to the kind of electrolyte used. Batteries using a liquid electrolyte are generally referred to as lithium-ion batteries, and batteries using a polymer electrolyte are referred to as lithium-polymer batteries. The lithium-ion batteries are manufactured in various shapes, typically cylindrical and rectangular shapes.

FIG. 1 shows an example of a rectangular secondary battery 10 commercially available in the market.

Referring to the drawing, the rectangular secondary battery 10 has a case 11, and an electrode assembly 12 inside the case 11. The electrode assembly 12 is formed such that a positive electrode plate and a negative electrode plate are alternately stacked and a separator is interposed therebetween as an insulator. The case 11 is hermetically sealed by a cap assembly 20. The cap assembly 20 is welded to the case 11 to hermetically seal the case 11. The cap assembly 20 includes a cap plate 21, welded to the case 11 to hermetically seal the case 11, having a throughhole 21a, a gasket 24 and an insulating plate 25, respectively positioned in the lower and upper portions of the cap plate 21, and riveted by a terminal member 23 penetrating the same, and a terminal plate 26, installed on the bottom surface of the insulating plate 25, supported by the terminal member 23 and connected with a positive electrode tab 12a of the electrode assembly 12.

In the aforementioned rectangular battery, the throughhole 21a in the cap plate 21 is hermetically sealed by the gasket 24 and the insulating plate 25 is riveted by the terminal member 23 to be combined with the cap plate 21. However, since the bonding strength of the terminal member 23 is weak, the sealing capability is poor. In order to ensure complete sealing of the throughhole 21a by the gasket 24 and the insulating plate 25, 30 to 40% compression of the gasket 24 should be maintained by the bonding strength between the gasket 24, the cap plate 21, the insulating plate 25 and the terminal plate 26 by the terminal member 23. In order to attain light-weight secondary batteries, the terminal member 23 may be aluminum. Also, in order to improve the sealing capability, a head 23a of the terminal member 23 may be extended in a longer side direction. However, in these cases, the bonding strength of the terminal member 23 is reduced, thereby lowering the sealing capability of the throughhole 21a.

If the sealing capability of a throughhole, in a cap plate, through which a terminal member is drawn out, is lowered, leakage of the electrolyte occurs, which shortens the lifetime of the battery and causes contamination.

Another example of a cap assembly for a rectangular secondary battery is disclosed in U.S. Pat. No. 5,985,478 and Japanese Patent Laid-Open Publication Hei 11-329407.

In the disclosed structure, a throughhole in a negative electrode plate is simply riveted using a rivet connected with a tab in a state in which an insulator and a gasket are positioned in the upper and lower portions of the negative electrode plate. This structure increases the sealing capability of the throughhole but there is a limitation.

SUMMARY OF THE INVENTION

To solve the above problems, it is an object of the present invention to provide a secondary battery having a cap assembly which can improve the sealing capability of a throughhole by increasing the bonding strength between a gasket, the cap plate and an insulating plate by means of a terminal member, and can increase the life time of the battery by preventing leakage of an electrolytic solution.

Accordingly, to achieve the above object, there is provided a secondary battery having a cap assembly, including an electrode assembly, a case into which the electrode assembly is inserted, and a terminal member having a cap plate coupled to the case to hermetically seal the case and a stepped protrusion, penetrating the cap plate to be riveted, insulated from the cap plate by an insulating member, and having a stepped protrusion on its head so as to press the insulating member in multiple steps, and the terminal member connected to a terminal of the electrode assembly.

In the present invention, the head may be formed of a non-circular or rectangular shape. Also, the width of the protrusion formed on the head is preferably smaller than or equal to a smaller width of the head.

Alternatively, the present invention provides a secondary battery having a cap assembly, including an electrode assembly having a plurality of negative and positive electrode plates, a rectangular case into which the electrode assembly is inserted, a terminal member having a cap plate, coupled to the case to hermetically seal the case, having a throughhole, a gasket position on the cap plate having the throughhole, an insulating plate and a terminal plate positioned in the lower portion of the cap plate, and a stepped protrusion, penetrating the gasket, the throughhole, the insulating plate and the terminal plate to then be riveted, on its head so as to press the gasket in multiple steps.

In the present invention, the head may be formed of a non-circular or rectangular shape. Also, the protrusion protrudes to be narrower than the width of the head corresponding to the gasket. An extension cut lengthwise is formed on the protrusion.

BRIEF DESCRIPTION OF THE DRAWINGS

The above object and advantages of the present invention will become more apparent by describing in detail a preferred embodiment thereof with reference to the attached drawings in which.

DESCRIPTION OF THE PREFERRED EMBODIMENT

Figure 1:
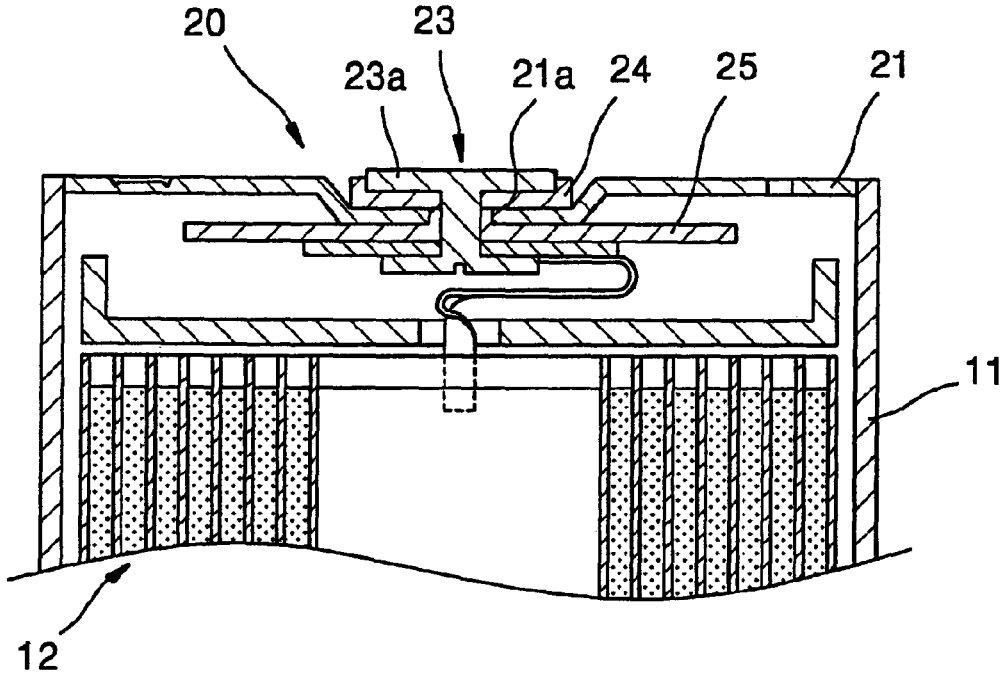
FIG. 1 (PRIOR ART)
FIG. 1 is a cross-sectional view illustrating a conventional secondary battery having a cap assembly.
Figure 2:
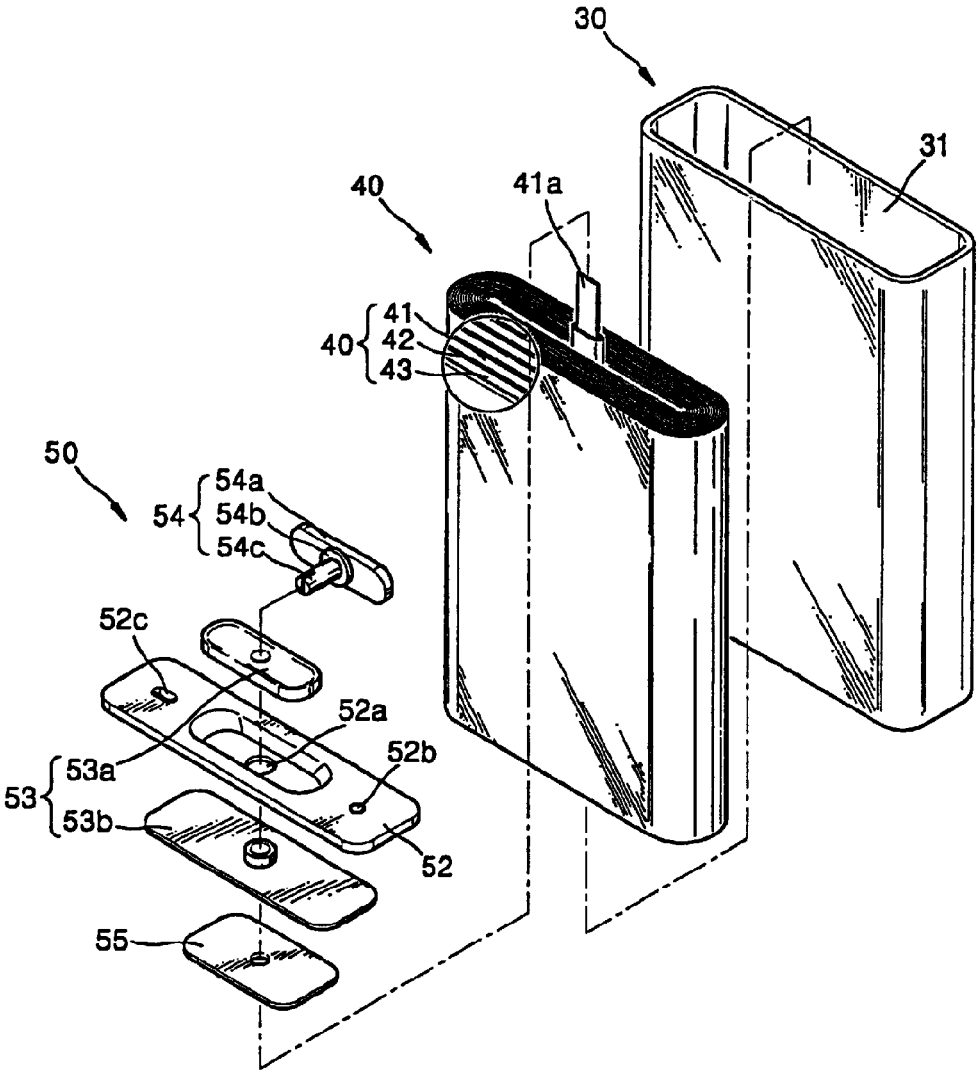
FIG. 2 is an exploded perspective view illustrating a secondary battery having a cap assembly according to the present invention.

FIG. 2 shows a rectangular secondary battery according to a preferred embodiment of the present invention.

As shown, the rectangular secondary battery is a rectangular solid, and includes a case 30 having an opening 31 whose top plane is opened, an electrode assembly 40 inserted into the case 30, and a cap assembly 50, coupled to the case 30 to hermetically seal the case 30, having a terminal member 54 connected to a positive electrode of the electrode assembly 40 and insulated from the case 30, which will be described later.

The case 30 is made of a conductive metal such as aluminum or an aluminum alloy, and the shape thereof is not limited to a rectangular solid having a space for installing the electrode assembly 40, and any shape that can accommodate the electrode assembly 40 may be employed.

The electrode assembly 40 is formed by stacking units each unit consisting of a positive electrode plate 41, a negative electrode plate 43 and a separator 42 interposed therebetween. Otherwise, the positive electrode plate 41, the separator 42 and the negative electrode plate 43 are stacked and the stacked structure is wound and then pressed, thereby forming a plate-shaped assembly. In the electrode assembly 30 having the aforementioned configuration, a negative electrode tab (not shown) of the negative electrode plates 43 is connected to the case 30, and a positive electrode tab 41a is connected to the terminal member 54 of the cap assembly 50.

The cap assembly 50, connected to the case 30, includes a cap plate 52 coupled to the case 30 to hermetically seal the case 30, and the terminal member 54 penetrating the cap plate 52 to be riveted, and having a head 54a having a wide contact area with an insulating member 53 for insulation of the cap plate 52 by pressing the insulating member 53 in multiple steps. Nickel may be plated on the terminal member 54 formed of copper or brass. The head 54a of the terminal member 54 has of a non-circular shape elongated lengthwise or a rectangular shape. Also, a protrusion 54b having a width smaller than or equal to a smaller width of the head 54a, is formed on the bottom surface of the head 54a, so that the bottom surface of the head 54a is step. Here, multiple steps may gradually decrease the size of the protrusion 54b. The protrusion 54b has an extension 54c which extends therefrom and whose end is cut lengthwise.

Insulation between the cap plate 52 and the terminal member 54 by the insulating member 53 is provided such that the throughhole 52a in the cap plate 52, a gasket 53a and an insulating plate 53b, that function as the insulating member 53, are formed on the upper and lower surfaces of the cap plate 52 and the terminal plate 55 is positioned on the bottom surface of the insulating plate 53b. In such a state, the terminal member 54 penetrates the cap plate 52 and the insulating member 53 to be riveted, thereby achieving insulation between the cap plate 52 and the terminal member 54. Also, the gasket 53a is pressed in multiple steps to hermetically seal the throughhole 52a. Here, the compression of the gasket 53a by the head 54a of the terminal member 54 is preferably 35 to 40% of the thickness of the gasket 53a.

The positive electrode tab 41a of the electrode assembly 40 may be welded to the terminal plate 54 and electrically connected to the terminal member 54. An electrolyte injection vent 52b and a safety valve 52c may be provided in the cap plate 52.

Figure 3:
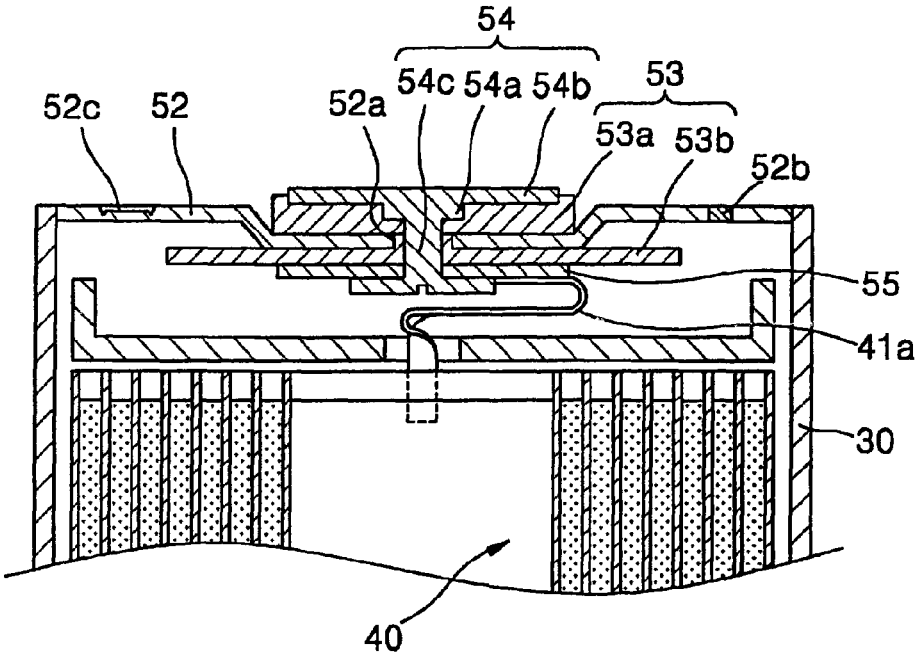
FIG. 3 is an partially cut-away cross-sectional view illustrating the secondary battery having a cap assembly shown in FIG. 2.
Figure 4:
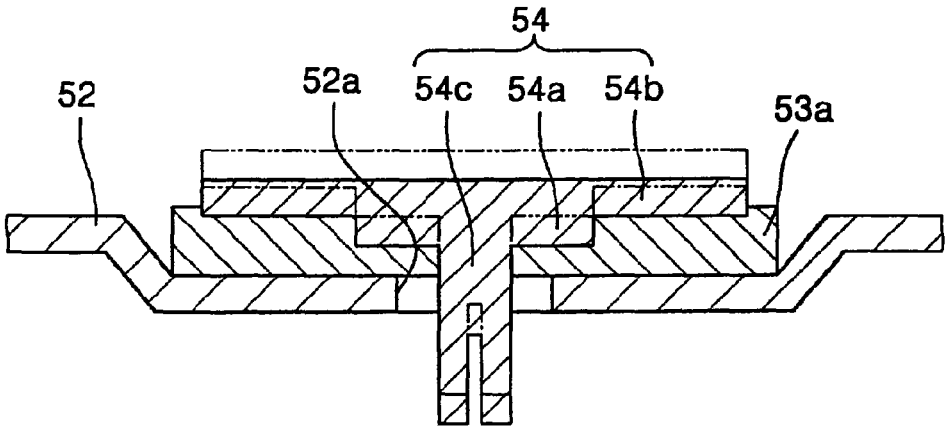
FIG. 4 is a cross-sectional view illustrating a gasket compressed by a head of a terminal member shown in FIG. 2.

The above-described cap assembly 50 for a rectangular battery has the protrusion 54b on the bottom portion of the head 54a of the terminal member 54. Thus, during riveting, as shown in FIGS. 3 and 4, the gasket 53a is compressed in multiple steps. In other words, the gap between the bottom surface of the protrusion 54b on the bottom surface of the head 54a and the top surface of the cap plate 52 is relatively narrow, and the gap between the bottom surface of head 54a and the top surface of the cap plate 52 is relatively wide, so that the gasket 53a is pressed by the head 54a and the protrusion 54b with different pressures, that is, the gasket 53a is pressed stepwise. Also, the contact area between the head 54a and the gasket 53a can be increased. Thus, the air tightness of the terminal member 54 penetrating the cap plate 52 and the sealing capacity of the throughhole 52a can be enhanced.

The inventor of the present invention carried out and experiment testing the compression ratio of a gasket by a terminal member for the present invention in a secondary battery and a terminal member for the conventional secondary battery in which a protrusion is not formed on a head, and the experimental results are shown in Table 1. The compression ratios listed below are averages of of 50 samples obtained after carrying out the tests 5 times.

TABLE 1

| | 1st | 2nd | 3rd | 4th | 5th |
|---|---|---|---|---|---|
| Prior art secondary battery | 32.4% | 39.0% | 33.8% | 30.9% | 34.8% |
| Present invention secondary battery | 36.5% | 38.7% | 35.6% | 37.9% | 35.6% |

Also, the inventor of the present invention carried out an experiment for testing electrolyte leakage due to a decrease in the sealing capacity 4 times to observe the relationship between the number of batteries in which leakage of an electrolyte occurred to a gasket portion and the number of total batteries manufactured. The results are shown in Table 2.

TABLE 2

| | 1st | 2nd | 3rd | 4th |
|---|---|---|---|---|
| Prior art secondary battery | 3/50 | 5/45 | 3/100 | 2/100 |
| Present invention secondary battery | 2/100 | 1/120 | 0/113 | 0/120 |

According to the present invention in which the protrusion 54b is formed on the head 54a, the compression ratios of a gasket have improved on the whole, as confirmed from Table 1, and the defects, that is, the electrolyte leakage at a gasket portion, were greatly reduced, as shown in Table 2.

As described above, according to the present invention, a head of a terminal member is elongated in a longer side direction into an elliptical or rectangular shape, thereby increasing the contact area. Also, since the compression ratio of a gasket is increased by forming a protrusion on the bottom surface of the head, so the insulating efficiency of an insulating member penetrating a cap plate and the sealing capability of a throughhole in the cap plate can be improved. Also, leakage of an electrolyte is prevented, thereby increasing the reliability of batteries and increasing the lifetime thereof.

While the invention has been described in terms of a specific embodiment, the description of the present invention is intended to be illustrative and it will be apparent to one of ordinary skill in the art that various changes and equivalent embodiments can be made therein without departing from the spirit and scope thereof.

What is claimed is:

1. A secondary battery having a cap assembly, comprising:

an electrode assembly *having a negative electrode and a positive electrode*;

a case in which the electrode assembly is located; and a cap assembly having a cap plate coupled to the case and hermetically sealing the case, a terminal member having a head and a stepped protrusion, penetrating the cap plate, and an insulating member insulating the terminal member from the cap plate, wherein the stepped protrusion presses the insulating member in multiple steps *and contacts with the insulating member at a plurality of parallel surfaces, wherein the parallel surfaces are not co-planar*, and the terminal member is connected to a terminal of the electrode assembly.

2. The secondary battery according to claim 1, wherein the head has one of a non-circular and rectangular shape.

3. The secondary battery according to claim 1, wherein the stepped protrusion is no wider than the head.

4. A secondary battery having a cap assembly, comprising:

an electrode assembly having a plurality of negative and positive electrode plates;

a rectangular case in which the electrode assembly is located; and a cap assembly having a cap plate, coupled to the case and hermetically sealing the case, a gasket positioned on an outside surface of the cap plate, an insulating plate and a terminal plate positioned on an inside surface of the cap plate, and a terminal member having a head with a stepped protrusion, wherein the stepped protrusion penetrates aligned throughholes in the cap plate, the gasket, and the insulating plate, and the terminal [plate] *member* is riveted at the stepped protrusion[.], so the head presses against the gasket [in multiple steps] *at a plurality of parallel surfaces, wherein the parallel surfaces are not co-planar*.

5. The secondary battery according to claim 4, wherein the head has one of a non-circular and rectangular shape.

6. The secondary battery according to claim 4 wherein the stepped protrusion is no wider than the head.

*7. The secondary battery according to claim 1, wherein the head and a stepped portion of the stepped protrusion contact with the insulating member.*

*8. The secondary battery according to claim 1, wherein a stepped portion of the stepped protrusion comprises a flat surface.*

*9. The secondary battery according to claim 1, wherein a portion of the stepped protrusion penetrates the cap plate and the insulating member.*

*10. The secondary battery according to claim 1, wherein the terminal member is riveted.*

*11. The secondary battery according to claim 1, where bottom surfaces of the head and the stepped portion contact with the insulating member.*

*12. The secondary battery according to claim 1, wherein the stepped protrusion has a width smaller than or equal to a smaller width of the head.*

*13. The secondary battery according to claim 1, wherein a bottom surface of the stepped protrusion is flat.*

*14. The secondary battery according to claim 1, wherein the extension of the stepped protrusion penetrates the cap plate and the insulating member.*

*15. The secondary battery according to claim 14, wherein an end of the extension is riveted.*

*16. The secondary battery according to claim 4, wherein the stepped protrusion has a width smaller than or equal to a smaller width of the head.*

*17. The secondary battery according to claim 4, wherein the bottom surface of the protrusion is flat.*

*18. The secondary battery according to claim 4, wherein an extension of the stepped protrusion penetrates aligned through holes in the cap plate, the gasket, and the insulating plate.*

*19. The secondary battery according to claim 18, wherein an end of the extension is riveted.*

* * * * *